United States Patent
Green et al.

(10) Patent No.: US 7,183,329 B2
(45) Date of Patent: Feb. 27, 2007

(54) PROCESS FOR THE ACTIVATION OF A CATALYST COMPRISING A COBALT COMPOUND AND A SUPPORT

(76) Inventors: Malcolm Leslie Hodder Green, Inorganic Chemistry Laboratory South Park Road, Oxford (GB) OX1 3QR; Tiancun Xiao, Inorganic Chemistry Laboratory South Park Road, Oxford (GB) OX1 3QR ( * ) Notice: Subject to any disclaimer, the term of this patent is extended or adjusted under 35 U.S.C. 154(b) by 101 days.

(21) Appl. No.: 10/481,986

(22) PCT Filed: Jun. 21, 2002

(86) PCT No.: PCT/GB02/02883

§ 371 (c)(1),
(2), (4) Date: Dec. 23, 2003

(87) PCT Pub. No.: WO03/002252

PCT Pub. Date: Jan. 9, 2003

(65) Prior Publication Data

US 2004/0242941 A1    Dec. 2, 2004

(30) Foreign Application Priority Data

Jun. 28, 2001   (GB)  ................................ 0115850.0

(51) Int. Cl.
C01B 3/40    (2006.01)
B01J 38/04   (2006.01)
B01J 23/75   (2006.01)

(52) U.S. Cl. ..................... 518/715; 252/373; 502/34; 502/325

(58) Field of Classification Search ............... 502/34, 502/325; 518/715; 252/373
See application file for complete search history.

(56) References Cited

U.S. PATENT DOCUMENTS

| | | | |
|---|---|---|---|
| 3,495,941 A | 2/1970 | Helden | |
| 4,234,462 A * | 11/1980 | Bondar et al. | 502/307 |
| 5,149,464 A | 9/1992 | Green et al. | |
| 5,168,091 A * | 12/1992 | Behrmann et al. | 502/325 |
| 5,292,705 A * | 3/1994 | Mitchell | 502/325 |
| 5,585,316 A * | 12/1996 | Nay et al. | 502/50 |
| 5,756,419 A | 5/1998 | Chaumette et al. | |
| 5,783,607 A | 7/1998 | Chaumette et al. | |
| 6,475,943 B1 * | 11/2002 | Hoek et al. | 502/53 |
| 6,486,221 B2 * | 11/2002 | Lapidus et al. | 518/715 |
| 6,579,510 B2 * | 6/2003 | Keller et al. | 423/573.1 |
| 6,875,411 B2 * | 4/2005 | Sanfilippo et al. | 423/437.1 |

FOREIGN PATENT DOCUMENTS

| | | |
|---|---|---|
| EP | 0 589 692 | 3/1994 |
| GB | 2225255 | 5/1990 |
| GB | 2236262 | 4/1991 |
| WO | WO-99/40299 A1 | 8/1999 |
| WO | WO 01/49808 | 7/2001 |
| WO | WO 01/49809 | 7/2001 |
| WO | WO 02/08361 | 1/2002 |
| WO | WO 02/08362 | 1/2002 |

OTHER PUBLICATIONS

Choudhary, V.R., et al., "Partial oxidation of methane to CO and $H_2$ over nickel and/or cobalt containing $ZrO_2$, $ThO_2$, $UO_2$, $TiO_2$ and $SiO_2$ catalysts," *Fuel*, vol. 77(15):1803-1807 (1998), no month.
United Kingdom Search Report Application No. GB0115850.0, dated Oct. 31, 2001.

* cited by examiner

*Primary Examiner*—Wayne A. Langel
(74) *Attorney, Agent, or Firm*—Lahive & Cockfield, LLP; Giulio A. DeConti, Jr.; Danielle L. Herritt

(57) ABSTRACT

A process for the preparation of a catalyst which comprises activating a catalyst precursor comprising a cobalt compound and a support with a gas comprising at least 5 mol % of a hydrocarbon.

22 Claims, No Drawings

PROCESS FOR THE ACTIVATION OF A CATALYST COMPRISING A COBALT COMPOUND AND A SUPPORT

RELATED APPLICATIONS

This application is a National Stage of International Application No. PCT/GB02/0288.3, filed Jun. 21, 2002, which claims the benefit of United Kingdom Application No. 0115850.0, filed Jun. 28, 2001.

TECHNICAL FIELD

The present invention relates to a catalyst and to a process for the preparation of a catalyst, in particular a catalyst for use in the partial oxidation of a hydrocarbon such as methane to synthesis gas or for use in a Fischer-Tropsch synthesis reaction or other reactions.

BACKGROUND

Catalysts are well known to be useful in certain reactions. In particular they can be used to promote particular reactions which would not normally take place in the absence of the catalyst.

An example of a reaction where a catalyst is useful is the production of syngas, which is a mixture of carbon monoxide and hydrogen in varying proportions. It is known to produce syngas by a steam reforming reaction wherein steam and methane are passed over a catalyst. Such a reaction is endothermic.

Recently syngas has also been produced by the partial oxidation of methane (POM). In this process methane is partially oxidised with oxygen in the following reaction:

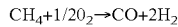

$$CH_4 + 1/2O_2 \rightarrow CO + 2H_2$$

The POM reaction has the great advantage of being exothermic, and hence does not require a great energy input. The process is described in further detail, for example, in Choudhary et al, Fuel, vol. 77, No. 15, pp 1803–1807, 1998, Slagtern et al, Catalysis Today, 46, 107–115, 1998 and WO 01/36,323. In a modification of this process, other hydrocarbons may be used as well as or instead of the methane. As used in this specification, the term "POM" is intended to cover not only the partial oxidation of methane but also the partial oxidation of any hydrocarbon.

The POM reaction generally uses a nickel or cobalt containing catalyst or a noble metal catalyst. For example Choudhary et al discloses the use of various such catalysts. For example, a cobalt containing catalyst can be prepared by mixing cobalt nitrate with a support such as silica gel and deionised water to form a thick paste, mixing the paste and drying and decomposing the paste in air at 600° C. for 4 hours before calcining the catalyst at 900° C. for 4 hours. This reference also indicates that the catalysts may be reduced using hydrogen before they are used, but that the performance of reduced and unreduced catalysts is comparable. It has also found that the best catalysts are nickel-containing catalysts such as $NiO-ThO_2$, $Ni-ZrO_2$ and $Ni-UO_2$.

Another example of a process where a catalyst is useful is in a Fisher Tropsch synthesis reaction in which a mixture of hydrocarbons is produced from carbon monoxide and $H_2$.

DETAILED DESCRIPTION OF THE INVENTION

We have now found a further catalyst which can be used in a variety of reactions such as a POM or Fischer Tropsch reaction. We have surprisingly found that this catalyst may have one or more advantages over the known catalysts.

The present invention provides a process for the preparation of a catalyst which comprises activating a catalyst precursor comprising a cobalt compound and a support with a gas comprising a hydrocarbon, especially at least 5 mol % of a hydrocarbon.

The present invention further provides the use of a catalyst obtainable by a process as defined above or a catalyst as defined above in the partial oxidation of a hydrocarbon or in a Fischer Tropsch reaction.

The present invention yet further provides a process for the preparation of a mixture of hydrocarbons by a Fischer-Tropsch reaction, which comprises passing a mixture of carbon monoxide and $H_2$ over a catalyst obtainable by a process as defined above or a catalyst as defined above.

The present invention additionally provides a process for the partial oxidation of a hydrocarbon which comprises passing such hydrocarbon and oxygen over a catalyst obtainable by a process as defined above or a catalyst as defined above.

As used herein, the term "catalyst" covers both the catalyst in active form and the catalyst in precursor form since it may undergo change in the reaction environment. The term "catalyst precursor" is to be construed widely, covering not only a freshly prepared catalyst precursor or a catalyst precursor which is unreduced or which has not been used in a reaction which it catalyses, but also any precursor which can be used as a catalyst after activation, such as a catalyst which has already been used in a reaction which it catalyses. Similarly the term "activation" is to be understood as not only including activating as unused or unreduced catalyst precursor but also activating a used or reduced catalyst. Therefore the term includes within its scope any activation, including regeneration of a used catalyst.

The process of the present invention uses an activation step with a hydrocarbon rather than with hydrogen as disclosed in, for example, Choudhary et al. It has surprisingly been discovered that such a catalyst may have advantageous characteristics such as a better activity and less susceptibility to deactivation over time.

The catalyst is prepared by activating a catalyst precursor with a hydrocarbon. The catalyst precursor contains a cobalt compound and a support. Such catalyst precursors are known and disclosed in the prior art, for example in Choudhary et al.

The support may be any support which is capable of bearing the catalyst in the desired reaction. Such supports are well known in the art. The support may be an inert support, or it may be an active support. Examples of suitable supports are alumina, modified alumina, spinel oxides, silica, modified silica, magnesia, titania, zirconia, a zeolite, β-aluminate and forms of carbon. The alumina or modified alumina may be, for example, α-alumina, β-alumina or γ-alumina. β-alumina and spinel oxides such as barium hexaaluminate have been found to be particularly useful in view of their stability. The carbon may be in the form, for example, of active carbon or carbon nanotubes. A zeolite may be chosen depending on the desired final product. Thus, for example, it may comprise pores or channels.

Preferably the support is porous. The particle size is desirably 0.2 μm to 0.4 mm, depending on the application.

The surface area is desirably greater than 5 m²/g. One or a mixture of two or more supports may be used.

The catalyst precursor also comprises a cobalt compound. Any cobalt compound may be used, but preferably it is in the form of a salt, especially an aqueous soluble salt, or oxide. Examples of suitable cobalt salts are cobalt nitrate, acetate, benzoate, oxalate and acetylacetonate. It is preferred to avoid the use of a cobalt halide since the halide may interfere with the support. An example of a suitable cobalt oxide is $Co_3O_4$. One or a mixture of two or more cobalt salts and/or oxides may be used.

The catalyst precursor is supported on the support. Depending on the nature of the reaction to be catalysed, the catalyst precursor may be distributed in any desired way on or in the support. Thus it may, for example, be distributed substantially throughout the support or only on the external surface of the support.

The catalyst precursor may be supported in any known manner. Thus it may, for example, be added to the support in solution in a solvent such as water or an organic solvent such as an alcohol, for example containing from 1 to 4 carbon atoms such as an methanol or ethanol and the solvent subsequently removed. The solvent may be removed, for example, by drying at room temperature (20° C.) or above, for example from 50° C. to 250° C. for from 1 to 24 hours. A combination of drying steps may be used. Thus, for example, the supported catalyst precursor may be dried at room temperature for from 2 to 10 hours, and subsequently dried at an elevated temperature, for example from 100° C. to 200° C., especially about 120° C., for from 2 to 8 hours.

The solution comprising the catalyst precursor may comprise further components if desired. Thus, for example, it may also comprise a promoter or modifier. Suitable promoters are alkaline earth salts such as magnesium, calcium, barium and/or strontium nitrate.

Suitable promoters also include the oxides of alkali metal, alkaline earth metal or transition metals which are derivable from their soluble compounds, such as their salts, for example $LiNO_3$, $KNO_3$, $RbNO_3$, $Ba(NO_3)_2$, $Mg(NO_3)_2$, $Ca(NO_3)_2$, $Sr(NO_3)_2$, $Zr(NO_3)_2.xH_2O$, $Ce(NO_3)_3.xH_2O$ and $UO(NO_3)_2$. The promoters can be loaded onto the support in any manner, for example by impregnation, especially sequential impregnation or co-impregnation with the cobalt compound.

Suitable modifiers are rare earth modifiers such as transition metal or rare earth salts or oxides, for example lanthanum and/or cerium nitrate or acetate, or oxides of the d-block transition metals such as Mn, W, Nb and Vn. The modifiers are generally derived from their aqueous soluble compounds such as salts, and may be impregnated into the catalyst support, followed by calcination, for example from 300° C. to 1000° C. for 1 to 24 hours in air. The promoters and modifiers may be used singly or in a combination of two or more. Preferably the supported catalyst precursor does not contain catalyst poisons such as phosphorus oxides, nitrogen oxides or sulphur oxides or compounds, and does not contain components having additional functionality such as absorbers, particularly absorbers for nitrogen oxides and/or sulphur oxides. The supported catalyst precursor, however, desirably comprises a promoter and/or a modifier.

The supported catalyst precursor may, if desired, be calcined. Calcination is not a required step in the process of the present invention. Calcination can take place in air, another gas comprising oxygen or in an inert atmosphere. A suitable calcination temperature is, for example, from 350° C. to 800° C., especially from 400° C. to 600° C., for from 1 to 10 hours. It is postulated, although we are not bound by this theory, that the calcination step changes the cobalt salt into an oxide form or mixture of oxide forms. The calcination step may also convert the promoter and/or modifier to oxide forms if they are present.

The supported catalyst precursor desirably comprises from 0.05 to 30 wt % cobalt, especially 0.5 to 15 wt %. For example, the supported catalyst precursor generally comprises from 0.5 to 50 wt % cobalt compound, 0 to 10 wt % promoter and 0 to 20 wt % modifier, especially 0.01 to 5 wt % modifier, based on the total weight of the supported catalyst precursor. For a POM reaction the supported catalyst precursor preferably comprises from 0.5 to 10 wt % cobalt compound, 0 to 5 wt % promoter and 0 to 3 wt % modifier. For a Fischer-Tropsch reaction the supported catalyst precursor preferably comprises from 5 to 40 wt % cobalt compound, 0 to 3 wt % promoter and 0 to 3 wt % modifier. The above percentages for the cobalt compounds are based either on the compound or the cobalt metal in the compound.

The supported catalyst precursor is then activated with a gas comprising a hydrocarbon. The hydrocarbon may be any hydrocarbon. It may be saturated or unsaturated, for example containing from 1, 2 or 3 or more double and/or triple bonds. It may be linear, cyclic or branched. The hydrocarbon may also be aliphatic or aryl or contain both aliphatic and aryl groups. Desirably the hydrocarbon is a saturated or unsaturated hydrocarbon containing up to five carbon atoms, especially up to four carbon-atoms. Especially preferred hydrocarbons are methane, ethane, acetylene, propane, propene and butane. One or a mixture of two or more hydrocarbons may be used.

The gas comprises at least 5 mol % of the hydrocarbon, preferably at least 10 mol %, more preferably at least 20 mol % and even more preferably at least 40 mol %. The hydrocarbon is in gaseous form.

The gas comprising the hydrocarbon may consist only of the hydrocarbon or may, for example in an amount up to 10 mol %, up to 20 mol % or up to 40 mol %. It may, if desired, comprise an inert gas such as nitrogen and/or argon. It may also comprise a reactive component, such as another component which also activates the catalyst precursor. Thus, for example, the gas may also comprise hydrogen. Especially useful combinations are a combination of methane and/or ethane with hydrogen. If hydrogen is used any ratio of hydrocarbon to hydrogen may be used, but it is preferably 0.04 or 0.05 to 100:1 on a molar basis, more preferably 0.1 or 0.5 to 10:1.

The activation is carried out by placing the supported catalyst precursor in an atmosphere of the activating gas. Desirably the activating gas is passed over the supported catalyst precursor. An elevated temperature is generally used. Desirably the activation temperature is at least 300° C., for example from 400° C. to 1000° C., especially from 400° C. to 800° C. The duration of activation is generally at least 30 minutes, preferably at least one hour, for example, from 1 to 20 hours, especially from 2 to 5 hours. The activation temperature may vary depending on the nature of the catalyst precursor and/or the hydrocarbon. Atmospheric pressure is normally used for the activation step, although a reduced or elevated pressure may also, if desired, be used.

The catalyst precursor may be activated in the reaction vessel in which it is intended to carry out the desired reaction using the activated catalyst, or it may be activated in a different vessel. The activated catalyst undergoes substantial oxidation when exposed to air. In order to stabilize the catalyst it may be treated in an atmosphere containing a small amount of oxygen, for example about 1% oxygen in an inert gas such as nitrogen or argon. Alternatively the catalyst can simply be left in the activation reactor while bleeding in a small amount of oxygen. Thus, for example, the activated catalyst may be pacified by treatment in a reduced oxygen atmosphere, for example comprising less than 20 mol % oxygen, less than 10 mol % oxygen, less than 5 mol % oxygen or less than 2 mol % oxygen, for at least 30 minutes, especially for at least one hour. The resulting passified catalyst may now be handled or stored in air for brief periods without further substantial oxidation.

The supported catalyst precursor may also be formed by a sol gel method. Such a method is described, for example, in Gonzalez et al, Catalysis Today, 35 (1997), 293–317 and J. Livage, Catalysis Today, 41 (1998), 3–19. For example, in an initial "pregelation" step, an alkoxide or alcohol and a metal precursor are hydrolysed and condensed to form a gel, for example, in the presence of water. A cobalt compound is then added in a subsequent "post gelation" step and the gel is dried and calcined.

For example aluminium-tri-sec-butylate (ASB) in 2-butanol is treated with 1,3-butandiol. A hydrolysis reaction occurs. $Co(H_2O)_6(NO_3)_2$(hydrated cobalt nitrate) is then added and the resulting gel stirred for 1 hour at 85° C. The solvent is removed under a flow of air or $N_2$ at 40° C. to 100° C. for 2 to 3 hours. The solid product is calcined at from 400° C. to 1,000° C. for 2 to 5 hours to produce the supported catalyst precursor.

It is postulated, although we are not bound this theory, that the activation of the catalyst precursor forms a mixture of metallic cobalt and cobalt carbides such as $Co_2C$ and/or $Co_3C$ on the support. XRD analysis shows that, when $H_2$ is used to activate the same catalyst precursor, the Co metal peak intensity is much more intense than when a hydrocarbon is used, suggesting that the hydrocarbon gives rise to smaller particles of cobalt metal than when hydrogen is used. This advantageously increases the surface area of the cobalt metal, which in turn increases the catalyst efficiency. Thus the activated catalyst may comprise carbon, in any form including elemental carbon and carbides such as cobalt carbides, in an amount of, for example, up to 20 wt %, especially 0.02 to 10 wt %.

The catalyst produced by the process of the present invention may be used in any process where a cobalt catalyst may be used, especially when a fixed or slurry bed reactor is used. Thus, for example, it may be used in a POM reaction, Fischer-Tropsch reaction, a hydroisomerisation reaction or a hydrogenation reaction.

In a POM reaction a mixture of a hydrocarbon and oxygen is passed over the catalyst to produce syngas. The hydrocarbon preferably contains from 1 to 16 carbon atoms and more preferably from 1 to 5 carbon atoms. Most preferably it is methane or natural gas. The hydrocarbon may be saturated or unsaturated, for example containing from 1, 2, 3 or more double and/or triple bonds. It may be linear, cyclic or branched. The hydrocarbon may also be aliphatic and aryl or contain both aliphatic and aryl groups. One or a mixture of hydrocarbons may be used.

In the POM reaction the oxidant is normally $O_2$. It may be pure $O_2$. However, it may be supplemented with $H_2O$ (steam) or $CO_2$, for example by addition to the feedstock. Thus $O_2$ and $H_2O$; $O_2$ and $CO_2$; or $O_2$, $H_2O$ and $CO_2$ may be used. This results in oxy-steam or oxy-dry reforming of methane, respectively. By this means the exothermicity and product ratio may be controlled as desired. The $O_2$, and optionally $H_2O$ and $CO_2$ may be used pure or diluted with an inert gas such as air, $N_2$, Ar or He.

Desirably the reaction takes place at a temperature of at least 500° C., for example from 700° C. to 1000° C. Desirably the pressure is atmospheric pressure (101 kPa) or above, for example from 1 to 60 atmospheres (101 kPa to 6080 kPa), especially from 1 to 30 atmospheres (101 kPa to 3060 kPa). The space velocity of the reactants may be, for example, from 1000 $h^{-1}$ to 1,000,000 $h^{-1}$, preferably 10,000 $h^{-1}$ to 600,000 $h^{-1}$. The mole ratio of the hydrocarbon being oxidized and the oxygen is desirably chosen such that a mixture of carbon monoxide and hydrogen is obtained in a stoichiometric ratio. Thus, for example, the atomic ratio of carbon such as methane to oxygen in the feedstock is desirably 0.9 to 5:1 or even higher, especially 1.0 or 1.8 to 3.5:1, more preferably 1 to 3:1, especially 1 to 2:1, especially about 1:1, although lower or higher ratios may also, if desired, be used.

It has been found that the catalyst produced by the process of the present invention usually has a number of advantages over cobalt catalysts which have been activated using hydrogen. Thus, for example, the catalysts are stable over time and do not suffer a decrease in activity. Furthermore the catalysts may have greater activity, for example an activity approaching that of ruthenium catalysts, but with the considerable advantage of being cheaper than ruthenium catalysts. Additionally it has been found that the catalysts produced by the process of the present invention do not promote carbon deposition, which is extremely undesirable in industrial processes. Cobalt catalysts activated with hydrogen typically suffer from carbon deposition after about 200 hours of use. The catalysts produced by the process of the present invention generally do not surfer from carbon deposition even after about 1000 hours of use.

The catalyst produced by the process of the present invention may also be used, for example, in a Fischer Tropsch synthesis reaction. Such a reaction produces a mixture of hydrocarbons and/or oxygenated hydrocarbons, for example gaseous, liquid and/or solid hydrocarbons and/or oxygenated hydrocarbons such as alcohols, from a mixture of hydrogen and carbon monoxide. Thus, for example, the reaction can be carried out immediately using syngas prepared by the POM method in directly linked reactors as disclosed in, for example, WO 01/36,323.

In the Fischer-Tropsch reaction, hydrogen and carbon monoxide are reacted over the activated cobalt catalyst at a temperature of, for example from 150 to 300° C. at atmospheric pressure (101 kPa) or above, for example from 1 atmosphere (101 kPa) to 20 atmospheres (2030 kPa). Similar advantages may be seen for the catalysts produced by the process of the present invention over those produced using pure hydrogen as an activating gas as for the POM reaction discussed above. Thus, for example, the catalyst may be more stable and/or more active. Similarly; it does not promote carbon deposition, and it may also be more selective to the desired mixture of hydrocarbons, especially hydrocarbons containing at least 5 carbon atoms. It may also produce a mixture of hydrocarbons having a great degree of unsaturation.

The present invention is now further illustrated in the following Examples.

EXAMPLE 1

1.0 g of $Al_2O_3$ support (particle size>250 μm, dried at 120° C. for 2 h) was impregnated with 1.0 ml of 0.2M $Ba(NO_3)_2$ solution. The mixture was dried at 120° C. for 4 hours, followed by calcination at 600° C. for 4 hours to obtain a BaO modified support. This modified support (1.05 g) was then impregnated with 1 ml of 2.4M $Co(NO_3)_2$ solution for 2 hours. The resulting solid was calcined to 600° C. to give the oxide precursor of the cobalt catalyst. This was then treated with 30 ml/min of 50% $CH_4/H_2$ at 800° C. for 2 h, and then cooled to room temperature in flow of 50% $CH_4/H_2$. The activated catalyst was treated with 1.0% $O_2/N_2$ at room temperature for 6 hours, 0.1 g of the activated catalyst was placed in a quartz tube, heated to chosen reaction temperatures in $N_2$, then a mixture of $CH_4$ and air was introduced into the reactor at 100 kPa (1 bar). The reaction conditions and products are listed in Table 1.

TABLE 1

$CH_4$ conversion and product distribution from methane partial oxidation (POM) over 12.5 wt % $Co/Al_2O_3$—BaO catalysts activated with 50% $CH_4/H_2$ to 800° C. for 2 h

| Reaction temperature (° C.) | $CH_4$ conversion (%) | CO selectivity (%) | $CO_2$ selectivity (%) | $H_2$/CO ratio |
|---|---|---|---|---|
| 600 | 57.60 | 56.52 | 43.48 | 2.70 |
| 650 | 67.97 | 71.08 | 28.91 | 2.34 |
| 700 | 75.67 | 79.95 | 20.04 | 2.17 |
| 750 | 83.53 | 87.63 | 12.36 | 2.01 |
| 800 | 91.07 | 91.93 | 8.06 | 1.99 |

Reaction conditions:
P: 100 kPa (1 bar), GHSV: 36,000 h$^{-1}$. Air was used as the oxidant.

EXAMPLE 2

1.0 g of $Al_2O_3$ support (particle size>250 μm) was impregnated with 1.0 ml of 0.2M $Ba(NO_3)_2$ solution. The solid was dried at 120° C. for 4 hours, and then calcined at 600° C. for 4 hours. The resulting BaO modified support ($Al_2O_3$—BaO) (1.05 g) was impregnated with 1 ml of 2.4M $Co(NO_3)_2$ solution for 2 hours. The mixture was then calcined at 600° C. to give the oxide precursor of the catalyst. This was treated with 20% $C_2H_6/H_2$ flowing at 30 ml/min at 630° C. and held at 630° C. for 2 h. The gas flow was stopped, and the reactor was cooled to room temperature without exposure to air. The catalyst was then treated with 1.0% $O_2/N_2$ for 3 h. 0.1 g of the ready-for-use cobalt catalyst was loaded to the quartz tube and heated to the chosen reaction temperature in $N_2$. A reactant mixture of $CH_4$ and air ($CH_4/O_2$ ratio, 2.01) was passed into the reactor at 100 kPa (1 bar). The reaction conditions and results are listed in Table 2.

TABLE 2

$CH_4$ Conversion and product distribution from POM over 12.5 wt % $Co/Al_2O_3$—BaO catalysts activated with 20% $C_2H_6/H_2$ to 630° C. for 2 h

| Reaction temperature (° C.) | $CH_4$ conversion (%) | CO selectivity (%) | $CO_2$ selectivity (%) | $H_2$/CO ratio |
|---|---|---|---|---|
| 600 | 60.74 | 63.92 | 36.08 | 2.60 |
| 650 | 71.81 | 71.08 | 28.91 | 2.34 |
| 700 | 77.18 | 81.86 | 18.14 | 2.13 |
| 750 | 84.78 | 88.63 | 11.37 | 2.00 |
| 800 | 92.05 | 93.93 | 6.07 | 1.99 |

Reaction conditions:
P: 100 kPa (1 bar), GHSV: 36,200 h$^{-1}$. Air was used as the oxidant.

EXAMPLE 3

1.0 g of $Al_2O_3$ support (particle size>250 μm) was impregnated with of 1.0 ml 0.15M $La(NO_3)_3$ solution. The mixture was dried at 120° C. for 4 h and then calcined at 700° C. for 2 h. The resulting $La_2O_3$ modified support ($Al_2O_3$—$La_2O_3$) (1.05 g) was impregnated with 1 ml of 1.0 M $Co(NO_3)_2$ solution for 5 hours, and calcined to 700° C. It was then treated with flowing $CH_4$ at 700° C. and held at 700° C. for 1 h, and then cooled to room temperature without exposure to air. Then it was treated with 1.0% $O_2/N_2$ at room temperature for 10 h. The-ready-for-use catalyst (0.1 g) was loaded in a quartz tube and heated to the chosen reaction temperatures in 10 ml/min of $CH_4$. A mixture of $CH_4$ and pure oxygen ($CH_4/O_2$ ratio, 2.01) was passed into the reactor at 100 kPa (1 bar). The reaction conditions and product distribution are listed in Table 3.

TABLE 3

$CH_4$ conversion and product distribution from POM over 5.6 wt % $Co/Al_2O_3$—$La_2O_3$ catalysts activated with pure $CH_4$ to 700° C. for 2 h

| Reaction temperature (° C.) | $CH_4$ conversion (%) | CO selectivity (%) | $CO_2$ selectivity (%) | $H_2$/CO ratio |
|---|---|---|---|---|
| 600 | 57.94 | 66.09 | 33.01 | 2.60 |
| 650 | 67.88 | 73.25 | 26.75 | 2.45 |
| 700 | 73.47 | 80.9 | 19.1 | 2.12 |
| 750 | 86.83 | 86.63 | 13.37 | 2.04 |
| 800 | 93.41 | 93.89 | 6.11 | 2.00 |
| 900 | 94.83 | 96.23 | 3.77 | 1.99 |

Reaction conditions:
P: 100 kPa (1 bar), GHSV: 18,600 h$^{-1}$. Pure oxygen was used as the oxidant.

EXAMPLE 4

1.0 g of α-$Al_2O_3$ support (particle size>250 μm) was impregnated with 1.0 ml of 0.12 M $Pr(NO_3)_3$ solution for 10 h while stirring. It was then calcined at 650° C. for 2 h. The resulting $Pr_2O_3$ modified support ($Al_2O_3$—$Pr_2O_3$) (1.05 g) was impregnated with 1 ml of 1.0 M $Co(NO_3)_2$ solution for 5 hours. The solid was calcined to 700° C. and held for 2 h, then cooled to room temperature. The resulting oxide precursor was then treated with 30 ml/min of $CH_4$ at 700° C. for 5 h and then cooled to room temperature. The activated catalyst was treated with 1.0% $O_2/N_2$ for 10 hours. The ready-for-use catalyst (0.1 g) was loaded in a quartz tube, heated to 860° C. in $N_2$, and then a mixture of $CH_4$ and air ($CH_4/O_2$ ratio, 2.01) was introduced into the reactor at several different flow rates and at 100 kPa (1 bar). The reaction conditions and product distribution are listed in Table 4.

TABLE 4

Effect of space velocity on $CH_4$ conversion and product distribution from POM over 5.6 wt % $Co/Al_2O_3$—$Pr_2O_3$ catalysts activated with pure $CH_4$ to 700° C. for 1 h

| GHSV ($h^{-1}$) | $CH_4$ conversion (%) | CO selectivity (%) | $CO_2$ selectivity (%) | $H_2$/CO ratio |
|---|---|---|---|---|
| 6,000  | 95.43 | 96.57 | 3.43 | 1.99 |
| 12,000 | 95.21 | 95.98 | 4.02 | 2.00 |
| 25,000 | 94.62 | 96.02 | 3.98 | 2.01 |
| 40,000 | 90.89 | 92.53 | 7.47 | 1.98 |
| 60,000 | 92.5  | 92.9  | 7.1  | 1.99 |

Reaction conditions:
P: 100 kPa (1 bar), reaction temperature: 860° C., air was used as the oxidant.

EXAMPLE 5

1.0 g of the BaO modified support ($Al_2O_3$—BaO) was impregnated wish 1 ml of 0.75 M $Co(NO_3)_2$ solution for 5 hours. The solid was calcined to 750° C. and then cooled to room temperature. It was then treated with 14 ml/min of $C_2H_6$ at 600° C., and then cooled to room temperature. The activated catalyst was treated with 1.0 $O_2/N_2$ for 3 h. The ready-for-use catalyst (0.1 g) was placed in a quartz tube, and heated to the selected reaction temperatures in $N_2$. A mixture of $C_2H_6$ and, air (C/O ratio, 1.0) was passed into the reactor at 100 kPa (1 bar). The product distribution is shown in Table 5.

TABLE 5

$C_2H_6$ conversion and product distribution from POM over 4.0 wt % $Co/Al_2O_3$—BaO catalysts activated with pure ethane to 600° C. for 2 h

| Reaction temperature (° C.) | $C_{C2H6}$ (%) | $S_{CH4}$ (%) | $S_{CO}$ (%) | $S_{CO2}$ (%) | $H_2$/CO ratio |
|---|---|---|---|---|---|
| 750 | 80.49 | 0.8 | 90.36 | 8.84 | 1.96 |
| 800 | 93.40 | 1.1 | 96.75 | 2.15 | 2.02 |
| 900 | 95.82 | 1.2 | 97.61 | 3.19 | 1.99 |

Reaction conditions:
P: 100 kPa (1 bar), GHSV: 25,000 $h^{-1}$, air was used as the oxidant.

EXAMPLE 6

1.0 g of the BaO modified support ($Al_2O_3$—BaO) was impregnated with 1 ml of 1.0 M $CoC_2O_4$ solution for 4 hours. The solid was dried at 100° C. for 3 h, calcined to 700° C. and held for 2 h, then cooled to room temperature. The resulting oxide precursor was treated with 30 ml/min of a mixture of 20% $C_2H_5/H_2$ to 750° C. and held for 2 lf. It was then cooled to room temperature and treated with 1.0% $O_2/N_2$ for 2 h. The ready-for-use catalyst (0.1 g) was loaded in a quartz tube, heated to the selected reaction temperatures in static 20% $C_2H_6/H_2$ and held for 0.5 hours. A mixture of $CH_4$ and air (containing steam) (C/O ratio 1.0; $H_2O/CH_4$ ratio 1.0) was introduced into the reactor at 100 kPa (1 bar). The reaction conditions and product distribution are listed in Table 6.

TABLE 6

$CH_4$ conversion and product distribution from oxy-steam combination reforming of methane over 5.6 wt % $Co/Al_2O_3$—BaO catalysts activated with mixture of ethane and hydrogen to 750° C. for 2 h

| Reaction temperature (° C.) | $CH_4$ conversion (%) | CO selectivity (%) | $CO_2$ selectivity (%) | $H_2$/CO ratio |
|---|---|---|---|---|
| 800 | 81.68 | 92.56 | 7.44 | 1.99 |
| 830 | 85.95 | 94.58 | 5.42 | 2.02 |
| 900 | 91.46 | 96.47 | 3.53 | 2.09 |

Reaction condition:
P: 100 kPa (6 bar), GHSV: 25,000 $h^{-1}$, air was used as the oxidant.

EXAMPLE 7

1.0 g of the BaO modified support ($Al_2O_3$—BaO) was impregnated with 1 ml of 1.0 M $Co(NO_3)_2$ solution for 5 hours. The solid mixture was dried at 100° C. for 3 h, and calcined at 650° C. for 2 h. The resulting oxide precursor of the catalyst (0.1 g) was placed in a quartz tube and treated with 20 ml/min of a mixture of 10% $CH_4/H_2$ or $H_2$ to 800° C. for 2 hours. The reactant gas was then switched to a mixture of $CH_4$ and air (C/O ratio 1.0), and the temperature was increased to 850° C. The carbon deposition was measured after 200 h run, and the reaction was continued until the $CH_4$ conversion decreased to less than 90%. The reaction conditions and results are listed in Table 7.

TABLE 7

Carbon deposition amount* and lifetime of 5.6 wt % $Co/Al_2O_3$—BaO catalysts activated with $CH_4/H_2$ and pure $H_2$ to 800° C. for 2 h

| Catalyst activated with | Amount of carbon deposition (%) | Life-time (h)** |
|---|---|---|
| $CH_4/H_2$ | 0.9 | >1000 |
| $H_2$ | 6.6 | 260 |

Reaction conditions:
P: 10 kPa (1 bar), Temperature: 850° C., GHSV: 25,000 $h^{-1}$, air was used as the oxidant.
*The amount of carbon was measured after 200 hour time-on-stream.
**Life-time is when the catalyst activity is reduced to less than 90%.

EXAMPLE 8

0.2 g of $SiO_2$ (>250 μm, dried at 200° C. for 4 h) was impregnated with 0.4 ml of water solution (containing 2.5M $Co(NO_3)_2$ and 0.2M $ZrO(NO_3)_2$) at room temperature, for 10 hours. The system was calcined at 450° C. for 4 h in air, cooled to room temperature, and then activated with 10% $CH_4/H_2$ at a temperature gradient of 2K/min to 500° C. and held for 1 h. Then it was cooled to 230° C., and the gas was changed to a mixture of 9 ml/min syngas (2 $H_2$+CO) and 1 ml/min $N_2$, with the pressure being increased to 600 kPa (6 bar). The mass balance and product distribution are shown in Table 8.

TABLE 8

Mass balance for F-T synthesis after 48 hour time-on-stream
Reaction conditions: 230° C., 600 kPa (6 bar),
0.2 g CoZr/SiO$_2$ catalyst activated with 10% CH$_4$/H$_2$

| Gas Supplied | ml/min | mg/min | Carbon mg/min | Hydrogen mg/min | Oxygen mg/min | Nitrogen mg/min |
|---|---|---|---|---|---|---|
| Hydrogen | 5.73 | 0.51 | | 0.51 | | |
| N$_2$ | 0.70 | 0.87 | | | | 0.87 |
| CO | 2.87 | 3.59 | 1.54 | | 2.05 | |
| Total | 9.30 | 4.97 | 1.54 | 0.51 | 2.05 | 0.87 |

| Calculated from GC analyses | vol % | ml/min | mg/min | mg/min | mg/min | mg/min | Conversion (%) | Selectivity (%) |
|---|---|---|---|---|---|---|---|---|
| Hydrogen | 40.65 | 1.62 | 0.144 | 0.00 | 0.14 | 0.00 | 71.8 | |
| Nitrogen | 17.61 | 0.70 | 0.874 | 0.00 | 0.00 | 0.00 | | |
| Methane | 6.80 | 0.27 | 0.193 | 0.14 | 0.05 | 0.00 | | 14.18 |
| CO | 24.26 | 0.96 | 1.205 | 0.52 | 0.00 | 0.69 | 66.4 | |
| CO$_2$ | 1.21 | 0.05 | 0.095 | 0.03 | 0.00 | 0.07 | | 2.53 |
| C$_2$ | 0.76 | 0.03 | 0.040 | 0.03 | 0.01 | 0.00 | | 3.17 |
| C$_3$ | 2.02 | 0.08 | 0.154 | 0.13 | 0.01 | 0.00 | | 12.62 |
| C$_4$ | 2.47 | 0.10 | 0.249 | 0.21 | 0.04 | 0.00 | | 20.57 |
| C$_5$ | 2.38 | 0.09 | 0.300 | 0.25 | 0.05 | 0.00 | | 24.81 |
| C$_6$ | 1.45 | 0.06 | 0.218 | 0.18 | 0.03 | 0.00 | | 18.10 |
| C$_7$ | 0.40 | 0.02 | 0.071 | 0.06 | 0.01 | 0.00 | | 5.84 |
| Total | 100.00 | 3.97 | 3.543 | 1.56 | 0.35 | 0.76 | | |
| H$_2$O | O$_2$ Balanced | 1.79 | 1.435 | | 0.14 | 1.29 | | |
| liquid product | H$_2$ Balanced | | 0.116 | 0.10 | 0.017 | | | 9.72 |

Carbon Balance

| | GC analysis | All products | Misc | |
|---|---|---|---|---|
| Nitrogen | 100.0 | 100.0 | GHSV (/hour) | 1860 |
| Oxygen | 37.0 | 100.0 | Gas Velocity (mm/s) | 1.98 |
| Hydrogen | 68.5 | 100.0 | | |
| Carbon | 101.2 | 107.7 | | |

EXAMPLE 9

1.0 g of γ-alumina (dried at 120° C. for 4 hours) was impregnated with 0.8 ml of 0.5 La(NO$_3$)$_3$ solution at room temperature for 2 hours while stirring. The mixture was left to stand in air for 20 hours, afterwards calcined at 600° C. for 4 hours, and then cooled to room temperature. The La modified alumina was then impregnated with 1 ml of 0.8 M Co(NO$_3$)$_3$.6H$_2$O solution; the mixing stirred at room temperature for 4 hours, and left to stand in air for 6 hours. It was then calcined at 600° C. for 4 hours to provide a Co$_3$O$_4$/Al$_2$O$_3$—La catalyst precursor for methane partial oxidation to synthesis gas.

0.01 g of the above catalyst precursor was loaded in a 6 mm (o.d) silica tube lined stainless steel reactor and treated minutes. Then a mixture stream of (6.1 ml/min CH$_4$+2.5 ml/min O$_2$ (pure)) was passed to the catalyst bed and the pressure increased to 800 kPa (8 bar). The catalyst performance is shown in Table 9.

TABLE 9

| | X$_{CH4}$ | Selectivity to CO | H$_2$/CO ratio | Tested time (Hours) |
|---|---|---|---|---|
| Catalyst performance | 80.5% | 98.7% | 1.99 | 800 |

Reaction temperature: 950° C.; pressure 800 kPa (8 bar) Feedstock composition: 2.5 CH$_4$/O$_2$, pure O$_2$ was used as the oxidant; excess methane was fed to eliminate the thermodynamic effect and increase yield and selectivity to CO$_2$ and H$_2$. CH$_4$ conversion and CO$_2$ selectivity were better in using air as the oxidant. GHSV: 516,000h$^{-1}$.

This makes it possible to configure a direct Fisher-Tropsch synthesis.

The invention claimed is:

1. A process for the preparation of an activated catalyst comprising 0.02% to 10 wt % carbon, which comprises activating a catalyst precursor comprising a cobalt compound and a support with a gas comprising at least 5 mol % of at least one hydrocarbon selected from the group consisting of methane, ethane, acetylene, propane, propane and butane, at a temperature of at least 300° C., wherein the catalyst precursor is a POM, Fisher-Tropsch, hydroisomerisation or hydrogenation catalyst precursor that comprises 0.05 to 30 wt % cobalt.

2. A process according to claim 1 wherein the support is alumina, modifed alumina, silica, modified silica, β-aluminate, magnesia, titania, a spinel oxide, zirconia, a zeolite or carbon.

3. A process according to claim 1 wherein the hydrocarbon is methane or ethane.

4. A process according to claim 1 wherein the catalyst precursor is activated at a temperature of from 300° C. to 1000° C.

5. A process according to claim 1 wherein the gas comprises at least 10 mol % of the hydrocarbon.

6. A process according to claim 5 wherein the gas comprises at least 20 mol % of the hydrocarbon.

7. A process according to claim 1 wherein the gas also comprises $H_2$, $N_2$, argon, helium or a mixture thereof.

8. A process according to claim 7 wherein the gas comprises $H_2$ and the ratio of hydrocarbon to hydrogen is from 0.04 to 10:1 on a molar basis.

9. A process according to claim 1 wherein the gas consists only of the hydrocarbon.

10. A process according to claim 1 wherein the catalyst precursor has been prepared by impregnating the support with a solution of a cobalt salt.

11. A process according to claim 10 wherein the cobalt salt is cobalt nitrate, acetate or oxalate.

12. A process according to claim 1 wherein the catalyst precursor has been prepared by a sol gel method.

13. A process according to claim 1 wherein the catalyst precursor is calcined before activation.

14. A process according to claim 13 wherein the catalyst precursor is calcined at a temperature of from 300° C. to 1000° C.

15. A process according to claim 1 wherein the activated catalyst is pacified by treatment in a reduced oxygen atmosphere for at least 30 minutes.

16. A process according to claim 1 wherein the gas consists essentially of said hydrocarbon and optionally an inert gas and/or hydrogen.

17. A process for the partial oxidation of a hydrocarbon which comprises:

activating a catalyst precursor comprising a cobalt compound and a support with a gas comprising at least 5 mol % of at least one hydrocarbon selected from the group consisting of methane ethane, acetylene, propane, propene and butane, at a temperature of at least 300° C., wherein the catalyst precursor is a POM catalyst precursor that comprises 0.05 to 30 wt % cobalt to form an activated catalyst comprising 0.02 to 10 wt % carbon; and passing the hydrocarbon and oxygen over the catalyst.

18. A process according to claim 17 wherein the hydrocarbon is methane and the partial oxidation produces syngas.

19. A process according to claim 17 wherein the atomic ratio of carbon to oxygen in the feedstock is 0.9 to 5:1.

20. A process according to claim 17 wherein the oxygen is present in the form of a mixture of $O_2$ and $H_2O$; $O_2$ and $CO_2$; or $O_2$, $H_2O$ and $CO_2$.

21. A process according to claim 17 wherein the oxygen is diluted with $N_2$, Ar, or He.

22. A process for the preparation of a mixture of hydrocarbons by Fischer-Tropsch reaction, which comprises:

activating a catalyst precursor comprising a cobalt compound and a support with a gas comprising at least 5 mol % of at least one hydrocarbon selected from the group consisting of methane, ethane, acetylene, propane, propane and butane, at a temperature of at least 300° C., wherein the catalyst precursor is a Fisher-Tropsch catalyst precursor that comprises 0.05 to 30 wt % cobalt to form an activated catalyst commission 0.02 to 10 wt % a carbon; and passing a mixture of carbon monoxide and $H_2$ over the catalyst.

* * * * *

UNITED STATES PATENT AND TRADEMARK OFFICE
CERTIFICATE OF CORRECTION

PATENT NO. : 7,183,329 B2 Page 1 of 1
APPLICATION NO. : 10/481986
DATED : February 27, 2007
INVENTOR(S) : Malcolm Leslie Hodder Green et al.

It is certified that error appears in the above-identified patent and that said Letters Patent is hereby corrected as shown below:

Title page Item (73), insert assignee information as follows:

Assignee: Isis Innovation Limited,
United Kingdom

Signed and Sealed this

Nineteenth Day of February, 2008

JON W. DUDAS
*Director of the United States Patent and Trademark Office*

UNITED STATES PATENT AND TRADEMARK OFFICE
CERTIFICATE OF CORRECTION

PATENT NO.         : 7,183,329 B2                                           Page 1 of 1
APPLICATION NO.    : 10/481986
DATED              : February 27, 2007
INVENTOR(S)        : Malcolm Leslie Hodder Green et al.

It is certified that error appears in the above-identified patent and that said Letters Patent is hereby corrected as shown below:

In the specification, at column 12, line number 54, in the printed patent, please change "propane, propane" to -- propane, propene --

In the specification, at column 14, line number 25, in the printed patent, please change "propane, propane" to -- propane, propene --

In the specification, at column 14, line number 28, in the printed patent, please change "commission" to -- comprising --

Signed and Sealed this

Twenty-third Day of September, 2008

JON W. DUDAS
*Director of the United States Patent and Trademark Office*